United States Patent [19]
Kasai

[11] Patent Number: 4,597,145
[45] Date of Patent: Jul. 1, 1986

[54] TAPPING MACHINE

[75] Inventor: Shigeo Kasai, Sagamihara, Japan

[73] Assignee: Amada Metrecs Company, Limited, Japan

[21] Appl. No.: 663,935

[22] Filed: Oct. 23, 1984

[30] Foreign Application Priority Data

Oct. 27, 1983 [JP] Japan .................. 58-165398[U]

[51] Int. Cl.⁴ .................. B23Q 1/06; B23G 1/16
[52] U.S. Cl. .................. 29/51; 408/139; 409/80; 409/219
[58] Field of Search .................. 29/51, 33 J, 39, 563, 29/564; 409/80, 219; 10/129 R, 130 R; 408/35, 139

[56] References Cited
U.S. PATENT DOCUMENTS

| | | | |
|---|---|---|---|
| 3,075,095 | 1/1963 | Stevens | 409/80 X |
| 3,124,018 | 3/1964 | Gough | 409/219 X |
| 3,202,895 | 8/1965 | Arpell | 409/80 X |
| 3,359,583 | 12/1967 | Strube | 10/130 X |
| 3,842,330 | 10/1974 | Kolell | 409/80 X |
| 4,355,446 | 10/1982 | Shimajiri et al. | 29/26 A |
| 4,358,228 | 11/1982 | Stark | 408/35 |

FOREIGN PATENT DOCUMENTS 2638601 3/1978 Fed. Rep. of Germany ........ 408/35

Primary Examiner—William R. Briggs
Attorney, Agent, or Firm—Wigman & Cohen

[57] ABSTRACT

A tapping machine of the type in which the workpiece is automatically positioned, has a releasable connection of the worktable and carriage with the means for horizontally moving the worktable and the means for horizontally moving the carriage, so that the worktable and carriage may be released for manual operation. The tapping machine also has a means for detecting the position of the carriage and a means for detecting excessive thrust from the workpiece. In addition, the tapping machine may be provided with means for detecting the position of the worktable and a control device having a memory connected with the means for positioning the worktable so that when the worktable is manually positioned, the manual position may be entered and recorded in the memory of the control device. The tapping machine may thus be programmed so that multivariety, small volume tapping is efficiently performed.

8 Claims, 4 Drawing Figures

TAPPING MACHINE

BACKGROUND OF THE INVENTION

1. Field of the Invention

The present invention relates to a tapping machine which carries out a tapping process in a previously drilled hole in a workpiece, such as a piece of sheet metal, and more specifically, relates to a tapping machine by which the tapping process on the workpiece is caried out automatically, under numerical control, by means of a tapping head after moving and positioning the workpiece.

2. Description of the Present Art

In general, in a tapping machine, the tapping process is carried out on a plurality of holes which have been drilled previously in a workpiece, such as a piece of sheet metal, using a drill press or a punch press. Conventionally, the number of holes which are tapped is exceedingly small in comparison to the number of holes drilled in advance in the workpiece, so that the positioning of the workpiece relative to the tapping machine is performed manually. For this reason, the work efficiency is poor, so that the interest is now toward positioning the workpiece automatically. However, in the case of multi-variety, small volume production, the program for positioning the workpiece automatically must be drawn up in order to be compatible with the workpiece each time the type or workpiece is changed, so that drawing up these programs becomes a problem.

In addition, in a conventional tapping machine, the spindle of the tapping machine generally rotates in a suitable manner and the advancement of the spindle is forced by means of a lead screw which conforms to the tapping pitch. Accordingly, in the case where the machining capacity of the tap decreases as a result of tap wear, the problem occurs in which the tap is forcibly advanced causing breakage.

SUMMARY OF THE INVENTION

An object of the present invention is to provide a tapping machine in which measures can be taken to prevent breakage of the tap.

Another object of the present invention is to provide a tapping machine in which a program for positioning the workpiece can be easily drawn up.

In order to achieve the above objects, in the present invention a detection device is provided on the worktable which supports the workpiece, and this detection device detects excessive pressure by means of a tap opposed to the worktable. In addition, a detection device is provided which detects positional movement in both the X and Y directions of the work table, and the drive device can be freely connected and disconnected to the work table in both the X and Y directions.

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF THE PREFERRED EMBODIMENT

Figure 1:
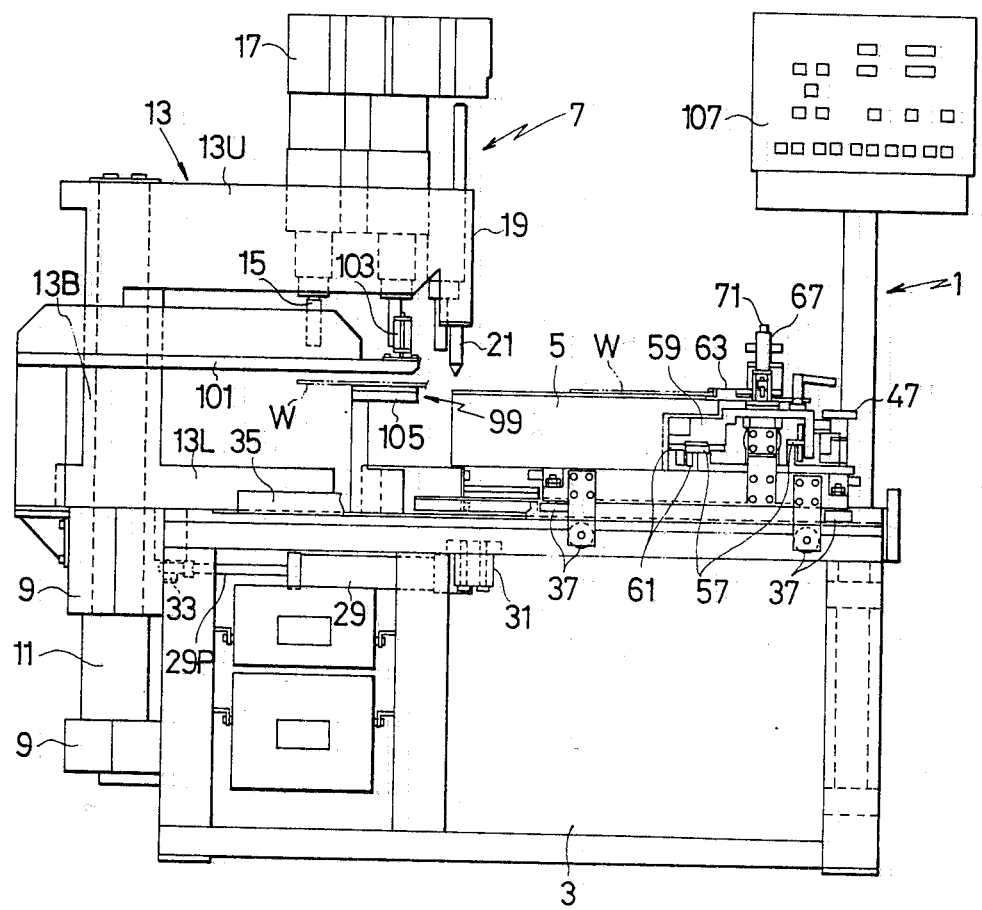
FIG. 1 is an elevational view of one embodiment of the tapping machine of the present invention.
Figure 2:
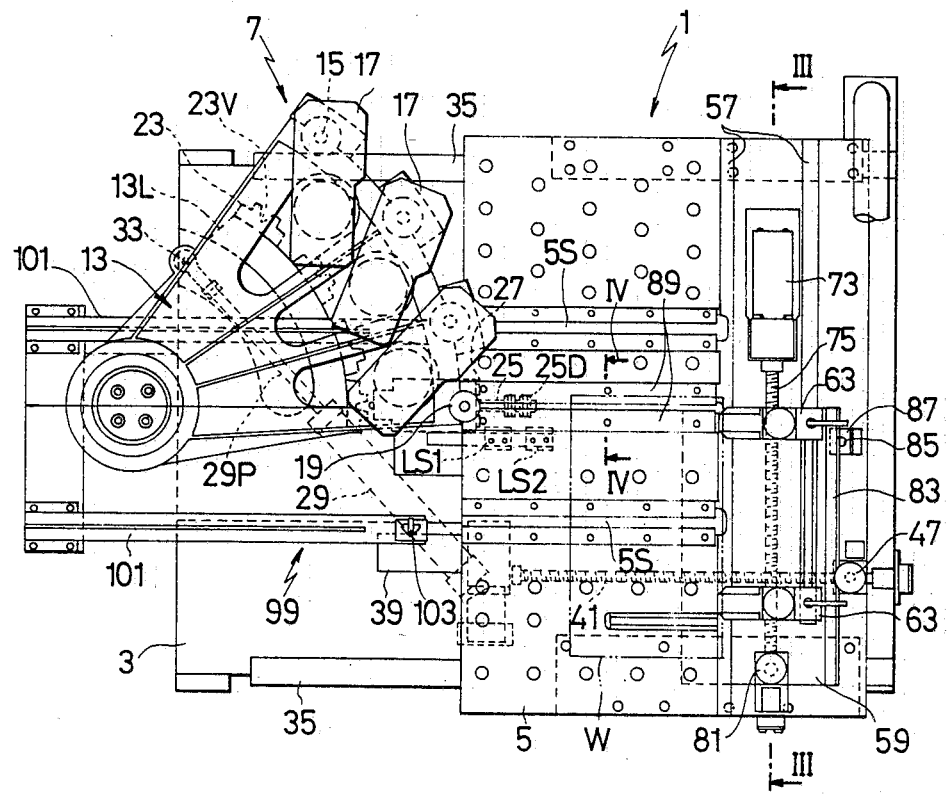
FIG. 2 is a plan view of the embodiment of the present invention.

Referring now to FIG. 1 and FIG. 2, a tapping machine 1 comprises a worktable 5 supported in a freely movable manner on a base pedestal 3 and a tapping process head device which performs the tapping process on a plate-shaped workpiece W which is mounted on the worktable 5.

The tapping process head device 7, which is mounted on one side of the base pedestal 3, is provided with a plurality of various tapping units so that a variety of types of tapping can be carried out on the workpiece W. More specifically, a column 11 is mounted in a vertical manner on one side of the base pedestal 3 through a plurality of support blocks 9, and a fan-shaped turret assembly 13 is installed horizontally in a freely rotatable manner on the column 11. The turret assembly 13 consists of an upper turret 13U and a lower turret 13L which are separated in the vertical direction, and the base sections of the upper turret 13U and the lower turret 13L are integrally linked by means of a hub section 13B. A plurality of tapping units 17, each of which is provided with a tap 15, are mounted on the end section of the upper turret 13U with a stylus device 19.

As shown in FIG. 2, each of the taps 15 on the plurality of tapping units 17 and a needle member 21 mounted freely movably in the vertical direction and on the stylus device 19, are positioned on a common arc. Accordingly, when the turret assembly 13 rotates around the centerline of the column 11, each of the taps 15 and the needle member 21 on stylus devices 19, which are on each tapping unit 17, describes a track in the shape of an common arc, and both the taps 15 and needle member 21 can be adjusted at the same process position.

The tapping unit 17 is provided with a drive device to drive and rotate the spindle on which the tap 15 is mounted and a mechanism to propel the spindle in the axial direction, and a detailed explanation of the structure and operation of the tapping unit 17 is omitted, because such a mechanism is well-known in the art. A detailed explanatory drawing is omitted, but the needle member 21 on the stylus device 19 is moved in the vertical direction by means of a built-in cylinder or by the action of a solenoid, and the bottom edge of the needle member 21 is adapted to engage with and disengage from a hole drilled in a template or the work piece W. Whether or not this needle member 21 engages with the hole in the workpiece W is detected by means of a detection device (not shown in the drawings), such as a limit switch, which detects the vertical movement of the needle member 21.

As shown in detail in FIG. 2, a plurality of indexing blocks 23, in each of which is provided a V-shaped engaging groove 23V, are mounted on the tip of the lower turret 13L in the turret assembly 13. The plurality of indexing blocks 23 are mounted on the lower turret 13L corresponding to the plurality of tapping units 17 and to the stylus devices 19. On the other hand, installed on the base pedestal 3 is an actuator 27, such as a solenoid or a cylinder, which is provided with a positioning pin 25, of which the tip section is freely engageable with the engaging grooves 23V of the indexing blocks 23. On the back edge of the positioning pin 25 is installed a dog 25D for activating a limit switch LS1 and a limit switch LS2, which are mounted on the base pedestal 3, and which are used to detect the presence of the engagement. Accordingly, the limits switches LS1 and LS2 detect whether or not the tip of the positioning pin 25 is engaging with the engaging groove 23V, making it possible to know whether or not the turret assembly 13 can rotate.

A detailed explanation drawing is not provided. However, on the base pedestal 3, a plurality of indexing limit switches corresponding to the plurality of indexing blocks 23 are arranged in the shape of an arc, and a dog is provided which actuates the above-mentioned limit switches on the lower turret 13L of the turret assembly 13. Accordingly, the dog, by the activation of each of these limit switches, can index and position each of the indexing blocks 23 in the position opposite to the actuator 27. In short, it is possible to index and position each tapping unit 17 and stylus device 19 in a fixed process position.

A rotary activation cylinder 29 is provided to activate the rotation of the turret assembly 13. The base of this cylinder 29 is mounted so that it freely pivots on a bracket 31 which is installed on the base pedestal 3, and the tip of a piston rod 29P, which is provided in the cylinder 29 so that it can move in a freely reciprocal manner, is connected and supported in a freely pivotal manner on the lower turret 13L of the turret assembly 13 through a hinge pin 33. Accordingly, by means of the expansive action of the cylinder 29, the turret assembly 13 is rotated around the column 11, and the plurality of tapping units 17 and stylus devices 19 on the upper turret 13U of the turret assembly 13 can be indexed and positioned in a fixed processing position.

Referring once again to FIG. 1 and FIG. 2, a guide rail 35 is installed extending in the left and right directions on both the front and back sides of the base pedestal 3, and the worktable 5 is supported on the guide rail 35 in a freely movable manner. On the worktable 5, a plurality of rollers 37 are provided which contact both the upper and lower surfaces and both side surfaces of the guide rail 35 in a freely rotatable manner. Accordingly, the worktable 5 is guided along the guide rail 35 in a freely reciprocating manner in the left and right directions only.

In order to cause the worktable 5 to move along the guide rail in a reciprocating manner in the left and right directions, a first rotary drive device 39, such as a servomotor or a step motor, is installed on the base pedestal 3, and extended parallel to the guide rail 35, and a first ball screw 41, which is linked to the rotary drive device 39, is mounted on the base pedestal 3 in a freely rotatable manner. As shown in detail in FIG. 3, a ball nut 43 is screwed onto the ball screw 41, and the lower edge of a connecting pin 47, which is supported in a cylindrical column 45 integrally mounted in a perpendicular manner on the worktable 5, is screwed in a freely attachable and removable manner into a threaded hole 43H drilled into the ball nut 43. In addition, a first rack 49 which extends parallel to the guide rail 35 is mounted on the lower surface of the worktable 5, and a positional movement detecting device 53, such as a pulse encoder, on which is provided a pinion 51 which engages the rack 49, is mounted by a bracket 55 on the base pedestal 3.

By means of the configuration thus described the worktable 5 runs along the guide rail 35 through the action of the rotary drive device 39, and is capable of moving automatically in the left-right direction. In addition, when, through the medium of the connecting pin 47, the connection between the ball nut 43 and the worktable 5 is released, movement in the left-right direction is possible by manual movement of the worktable 5 only. The positioning of the worktable 5 in the left-right direction can be detected by means of the moving position detection device 53.

As shown in FIG. 1 and FIG. 2, a second guide rail 57 is provided on the upper surface of the worktable 5 extending horizontally in the front and back direction which is perpendicular to the direction of movement of the worktable 5. On the guide rail 57 a carriage member 59 is supported so that it may move freely in a reciprocating manner. On the carriage member 59, a plurality of rollers 61 which contact the guide rail 57 in a freely rotatable manner, are provided so that they are freely rotatable. In addition, a plurality of work clamping devices 63, which freely grasp the edge section of the plate-shaped workpiece W, are mounted on the carriage member 59 so that they can freely adjust the position corresponding to the width of the workpiece W.

Figure 3:
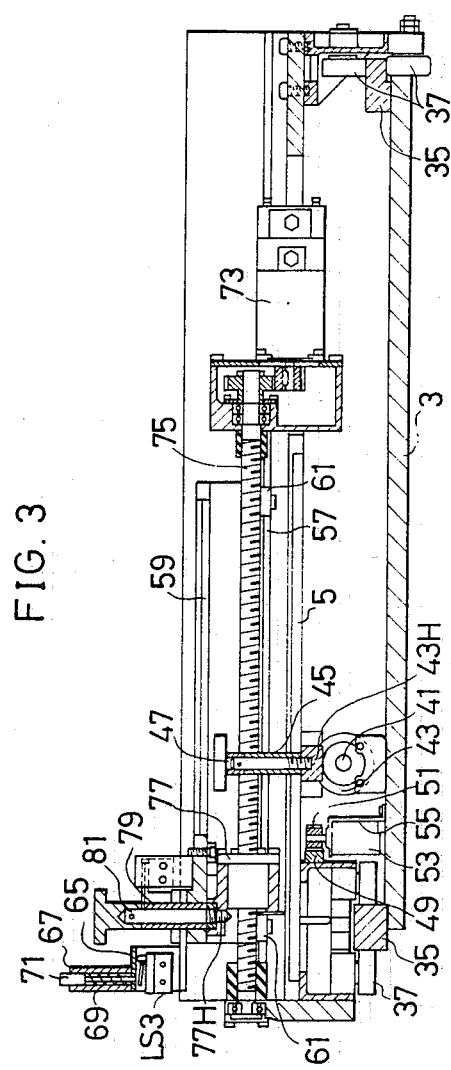
FIG. 3 is an enlarged sectional view taken along the line III—III of FIG. 1.

Furthermore, as shown in detail in FIG. 3, a cylindrically-shaped gripping member 67 is mounted on the carriage member 59 by a bracket 65. In the interior of the gripping member 67, a push pin 71 is installed which is forced in the upper direction by means of a built-in spring 69. The upper edge of the push pin 71 protrudes from the gripping member 67, and the lower edge of the push pin 71 is in correspondence with a limit switch LS3 which is mounted on the bracket 65. Accordingly, the limit switch LS3 can be activated by pressing down the push pin 71.

In order to cause the carriage member 59 to move along the guide rail 57, a second rotary drive device 73 is installed on the worktable 5, while at the same time a second ball screw 75 linked to the rotary drive device 73 and extending parallel to the guide rail 57 is installed in a freely rotatable manner on the worktable 5. As shown in detail in FIG. 3, a ball nut 77 is screwed onto the ball screw 75, and the lower edge of a connecting pin 81, which is supported in a cylindrical column 79 integrally mounted in a perpendicular manner on the carriage member 59, is screwed in a freely attachable and removable manner into a threaded hole 77H drilled into the ball nut 77. In addition, a second rack 83 which extends parallel to the guide rail 57 is mounted on the carriage member 59, and a moving position detecting device 87, such as a pulse encoder on which is provided a pinion 85 which engages the rack 83, is mounted on the worktable 5.

By means of the configuration thus described, the carriage member 59 can be automatically moved and driven by the rotary drive device 73. In addition, by releasing the connection between the ball nut 77 and the carriage member 59, through the connecting pin 81, movement of the carriage member 59 is possible by manual movement.

Figure 4:
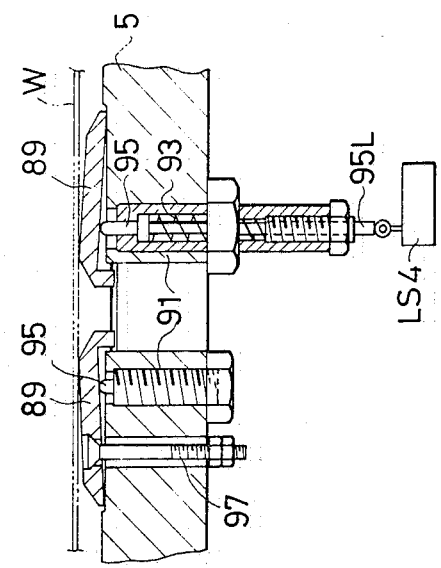
FIG. 4 is an enlarged sectional view taken along the line IV—IV of FIG. 1.

Referring to FIG. 2 and FIG. 4, in almost the center of the worktable 5, a pair of detection plates 89 extending in the left-right direction are installed so that they are slightly separated from one another. These detection plates 89 are always forced in the upward direction by the action of a protruding pin 95 and a spring 93 in a plunger device 91, installed in a plurality of locations on the worktable 5. The limit to the movement of the detection plates 89 in the upward direction is carried out by means of a plurality of regulating bolts 97 which penetrate the detection plates 89 and the worktable 5.

On one of or a plurality of suitably positioned protruding pins 95, an extended section 95L is provided, extending in the lower direction, and this extended seciton 95L opposes a limit switch LS4 suitably mounted on the worktable 5. Accordingly, when the detection plates 89 are forced downward by pressure exerted by the workpiece W, the limit switch LS4 is activated by the extended section 95L of the protruding pin 95.

Referring again to FIG. 1 and FIG. 2, a work securing device 99 is provided on the base pedestal 3 to ensure that the workpiece W does not move when the workpiece W is gripped and changed by the work clamping devices 63. To explain in more detail - on one side of the base pedestal 3, an arm member 101 which extends in the left-right direction is installed on both sides of the column 11. A pressure cylinder 103 is provided on the tip of this arm member 101 in order to secure the workpiece W by pressure. A supporting pedestal 105, which supports the work piece W from the lower part, is provided on the lower part of the pressure cylinder 103. Furthermore, on the worktable 5, a slit 5S is longitudinally formed in the left-right direction to avoid interference with the supporting pedestal 105.

In addition, a control device 107 for suitably controlling the various types of drive devices is installed on the base pedestal 3. The control device 107 is a suitable control device such as a numerical control device or a computer.

In a configuration such as has been outlined above, a template, or a workpiece which has already had the holes processed into it, is grasped in the work calmping device 63. The connection is released by the first and second connecting pins 47 and 81, and the work table 5 and the carriage member 59 are put in a status where they can be freely moved manually. On the other hand, the stylus device 19 is indexed and positioned in the process position on the tapping process head device 7.

Next, the gripping member 67 is suitably moved along the guide rails 35 and 57 as well as the worktable 5 and the carriage member 59. The hole to be tapped in the workpiece W is positioned at the lower position of the stylus device 19, and on pushing the push pin 71 the limit switch LS3 is activated. By the activation of the limit switch LS3, the needle member 21 on the stylus device 19 is made to descend, and the lower edge of the needle member 21 engages the hole to be subjected to the tapping process of the workpiece W. In this way, when the lower edge of the needle member 21 engages the lower hole of the workpiece W, the position coordinates of this hole are dectected by the first and second positional motion detection devices 53 and 87, and are entered and recorded in the memory of the control device 107. Afterward, in the same way, after the data of the position coordinates of the required holes of the workpiece W are entered into the memory of the control device 107, the worktable 5 and the carriage member 59 are connected respectively to the ball nuts 43 and 77 by the connecting pins 47 and 81. Then, based on the data of the position coordinates entered into the control device 107, the rotary drive devices 39 and 73 are controlled and rotated, and, through the movement of the worktable 5 and the carriage member 59, the positional motion of the workpiece W is automatically carried out.

The positional motion of the workpiece W is carried out as just described, and the suitable tapping unit 17 in the tapping process head device 7 is indexed in the processing position. When the tapping process is carried out on the hole of the workpiece W, in the case where the machining capacity of the tap 15 shows a large decrease, the detection plates 89 oppose the spring 93, and the limit switch LS4 is activated by the thrust of the tapping unit 17 through the workpiece W. When the limit switch LS4 is activated, the tap 15 is drawn back and excessive thrust of the tap 15 is deterred, so that breakage of the tap can be prevented. The present invention can be understood from the above description, and in the case where the tap is subjected to wear so that its machining capacity decreases, this wear can be detected before breakage of the tap occurs. In addition, in the case of multi-variety low-volume production the positional movement of the workpiece is easily and automatically implemented.

It should be understood, of course, that the foregoing relates only to preferred embodiments of the present invention and that numerous modifications or alterations may be made therein without departing from the spirit and scope of the invention as set forth in the appended claims.

What is claimed is:

1. A tapping machine comprising:
   a base pedestal;
   a column provided on the base pedestal;
   a turret installed horizontally in a freely rotatable manner on the column;
   a plurality of tapping means arranged on the turret on a common arc around the column;
   a worktable provided on the base pedestal for supporting a workpiece to be subjected to a tapping action;
   a means for horizontally moving the worktable in a direction toward or away from the column;
   a carriage means provided on the worktable having a clamp means to clamp the workpiece;
   a means for horizontally moving the carriage means in the direction perpendicularly to the moving direction of the worktable;
   releasable connection means connecting said worktable and said carriage means with said means for horizontally moving said worktable and said means for horizontally moving said carriage means whereby said worktable and said carriage means may be released for manual operation;
   means for detecting the position of the worktable;
   a control device having a memory and connected with said means for detecting the position of the worktable whereby when the worktable is manually positioned the said manual position may be entered and recorded in the memory of said control device.

2. The tapping machine of claim 1, wherein said detecting means consists of a position detecting device for detecting the position of the carriage relative to the worktable and a position detecting device for detecting the position of the worktable relative to the base pedestal.

3. The tapping machine of claim 2, wherein said detecting devices have pinions engaging with racks which are provided on the worktable and the carriage means.

4. The tapping machine of claim 1 further comprising a stylus device mounted on the turret and positioned on the common arc with the tapping means.

5. The tapping machine comprising:
   a base pedestal;
   a column provided on the base pedestal;

a turret installed horizontally in a freely rotatable manner on the column;

a plurality of tapping means arranged on the turret on a common arc around the column;

a worktable provided on the base pedestal for supporting a workpiece to be subjected to a tapping action;

a means for horizontally moving the worktable in a direction toward or away from the column;

a carriage means provided on the worktable having a clamp means to clamp the workpiece;

a means for horizontally moving the carriage means in the direction perpendicularly to the moving direction of the worktable;

releasable connection means connecting said worktable and said carriage means with said means for horizontally moving said worktable and said means for horizontally moving said carriage means whereby said worktable and said carriage means may be released for manual operation;

a means for detecting the position of the carriage means;

a detection means for detecting excessive thrust from the workpiece which is subjected to tapping action.

6. The tapping machine of claim 5, wherein said detection means is provided on the worktable.

7. The tapping machine of claim 6, wherein said detection means comprising at least one detection plate, a bias means for forcing the plate in the upward direction and a detector for detecting the movement of the plate which is forced downward by pressure exerted by the workpiece which is subjected to a tapping action.

8. The tapping machine of claim 7, wherein said plates are a pair of elongated plates which are extending in the moving direction of the worktable and located about the center line of the worktable.

* * * * *